United States Patent [19]

Taniguchi

[11] Patent Number: 4,799,771

[45] Date of Patent: Jan. 24, 1989

[54] LIQUID CRYSTAL DISPLAY WITH STOPPER PINS IN GUIDE MEANS

[75] Inventor: Koki Taniguchi, Osaka, Japan

[73] Assignee: Sharp Kabushiki Kaisha, Osaka, Japan

[21] Appl. No.: 819,023

[22] Filed: Jan. 15, 1986

[30] Foreign Application Priority Data

Jan. 22, 1985 [JP] Japan .................. 60-7837[U]
Apr. 15, 1985 [JP] Japan .................. 60-56493[U]

[51] Int. Cl.$^4$ .............................................. G02F 1/13
[52] U.S. Cl. .................................... 350/334; 350/345;
40/448; 248/224.1
[58] Field of Search .................. 350/334, 336, 345;
339/17 LM, 17 M; 340/784; 248/473, 466, 469,
224.1, 224.2; 362/19, 20, 23, 28, 29; 40/448,
575, 576

[56] References Cited

U.S. PATENT DOCUMENTS

| | | | |
|---|---|---|---|
| 2,588,183 | 9/1951 | Vigon | 40/576 X |
| 3,660,803 | 5/1972 | Cooney | 339/17 LM |
| 4,138,195 | 2/1979 | Saurer et al. | 350/345 |
| 4,142,781 | 3/1979 | Baur et al. | 350/345 |
| 4,549,174 | 10/1985 | Funada et al. | 350/336 X |
| 4,562,478 | 12/1985 | Hirasawa et al. | 350/345 X |
| 4,567,481 | 1/1986 | Meier et al. | 340/716 |
| 4,584,786 | 8/1986 | Georgopulos | 40/448 |
| 4,634,199 | 1/1987 | Anhalt et al. | 339/17 M |

FOREIGN PATENT DOCUMENTS 2910779 of 0000 Fed. Rep. of Germany .
3144535 of 0000 Fed. Rep. of Germany .
2013954 of 0000 United Kingdom .

OTHER PUBLICATIONS

"Microcompressor Controls LCD Instrument Cluster", 1983 Society of Automotive Engineers, Inc., vol. 91, No. 6, pp. 37–41.
"LT–9315D Series LED Backlight Panel Display Devices", Sharp Corp., DI-22, Aug. 1983.

Primary Examiner—Stanley D. Miller
Assistant Examiner—David Lewis
Attorney, Agent, or Firm—Birch, Stewart, Kolasch & Birch

[57] ABSTRACT

Disclosed is a liquid crystal display device containing an electrode substrate, a circuit substrate, and a flat-type back light, which incorporates a guide apparatus consisting of several guide members for guiding the back light onto the back surface of the electrode substrate, in which the guide members provide grooves with tapered ends and a narrowed shape at one end, but a wide juncture portion for connecting the guide members together. The edges of the back light unit fit in the grooves. Stopper members are provided facilitate connection to the electrode substrate; and fixing members are provided to secure the guide members to the circuit substrate.

7 Claims, 5 Drawing Sheets

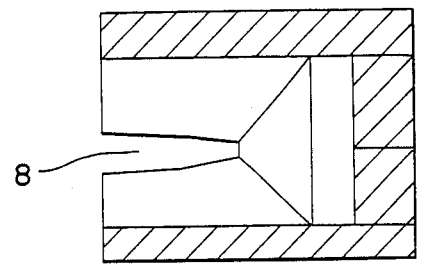
FIG. 5
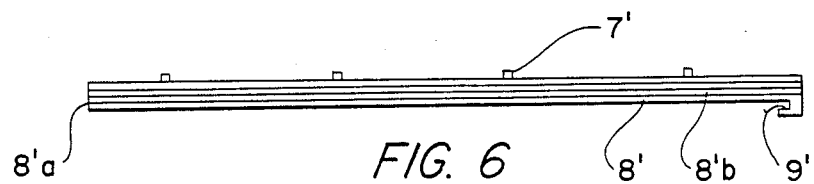
FIG. 6
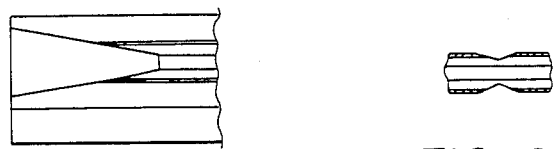
FIG. 7
FIG. 8

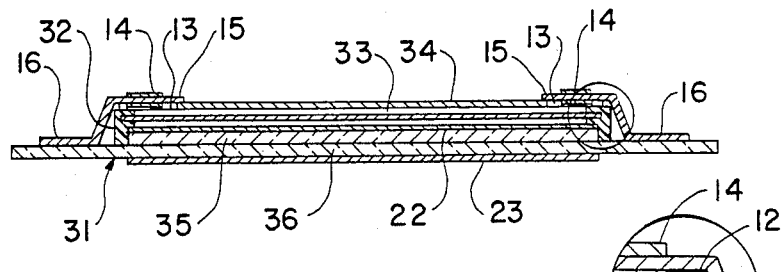
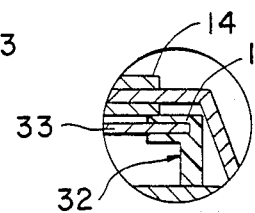
FIG. 10(a)
FIG. 10(b)
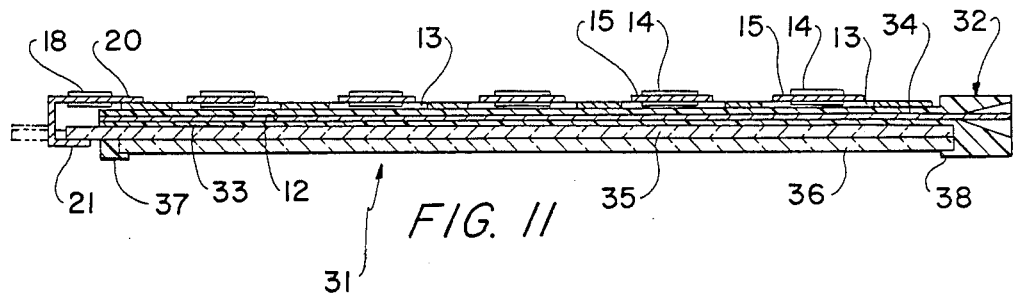
FIG. 11

LIQUID CRYSTAL DISPLAY WITH STOPPER PINS IN GUIDE MEANS

BACKGROUND OF THE INVENTION

The present invention relates to a liquid crystal display device (LCD) with a flat-type light source which illuminates the liquid crystal cells from behind. Because liquid crystal is not a self-illuminating element, a back light such as electro-luminescence (EL) is required to allow display in darkness. Nevertheless, no conventional liquid crystal display has ever been provided with a member specifically designed to facilitate installation of a back light behind liquid crystal cells.

SUMMARY OF THE INVENTION

The present invention is to provide a liquid crystal display device with members ideally suited for guiding and installing a back light on the back of the liquid crystal cells of an LCD. Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from the following detailed description. To realize the above objects, according to one of the preferred embodiments of the present invention, this unique LCD device is provided with electrode substrates, circuit substrates and a flat-type back light, wherein the device uses guide members for allowing installation of the back light behind the electrode substrate. Specifically, the guide members include guiding grooves which have tapered ends with wide apertures and a narrow end portion. A wide groove is provided at the juncture of the guide members; stopper members are provided for connecting the flat-type back light to the electrode substrate; and fixing members are provided for securing the guide members to the circuit substrate. Another preferred embodiment of the present invention includes an LSI-driven LCD panel connected to the printed wiring board and which is capable of displaying pictures through back light illumination. The guide members are installed behind the display panel to allow insertion and to hold the back light securely, while the printed wiring board is mounted onto the part opposite the liquid crystal panel of the guide member. This embodiment also incorporates a film-carrier LSI. In that case, it is preferable that the output terminal of the film-carrier LSI is bent inward to be connected to the front surface of the liquid crystal display panel.

BRIEF DESCRIPTION OF THE DRAWINGS

The present invention will be better understood from the detailed description given hereinbelow and the accompanying drawings which are given by way of illustration only, and thus are not limitative of the present invention in which:

FIG. 5 is the shape of the groove formed in the guide member shown in FIG. 4;

FIG. 6 is an enlarged view of another guide member built in the liquid crystal display device shown in FIG. 1;

FIGS. 7 and 8 are fragmentary structural views of the guide member other than those shown above;

FIG. 10 is a sectional view of the back-light-provided liquid crystal display device shown in FIG. 9 of line II—II; and FIG. 11 is a sectional view of the back-light-provided liquid crystal display device shown in FIG. 9 of line III—III.

DETAILED DESCRIPTION OF THE PREFERRED EMBODIMENTS

Figure 1:
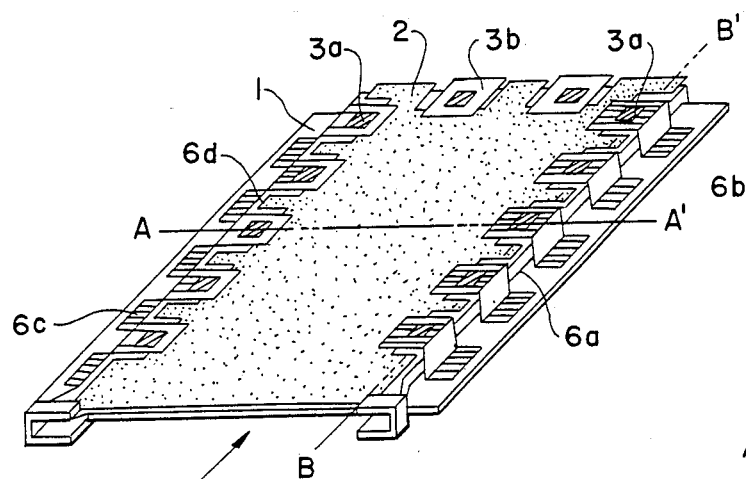
FIG. 1 is a schematic diagram showing the entire configuration of the liquid crystal display device reflecting the primary preferred embodiment of the present invention.
Figure 1:
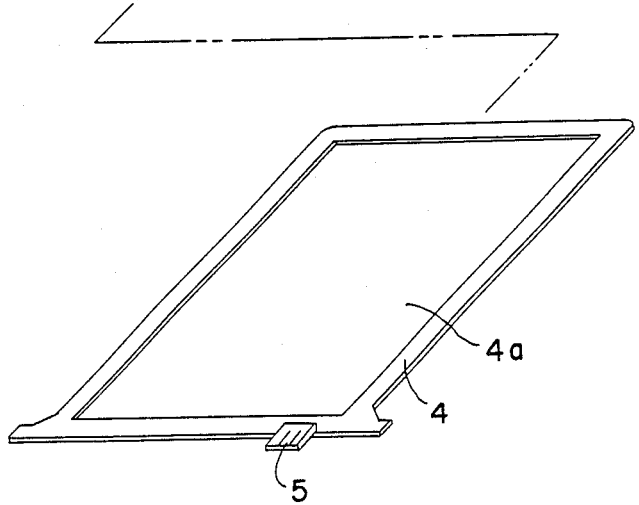

FIG. 1 is a schematic diagram showing the entire configuration of the liquid crystal display device incorporating the primary preferred embodiment of the invention. In FIG. 1, the reference number 1 indicates an electrode substrate, an electrode panel on which an electrode pattern is formed (not shown). Current conduction through the electrode pattern of electrode substrate 1 is controlled by a circuit substrate 2, segment electrode-driving LSIs 3a, , and a common electrode-driving LSI 3b. A flat-type back light 4 (such as an organic EL panel) is inserted between the electrode substrate 1 and the circuit substrate 2, which face each other. The back light 4 has a luminous element 4a in the center, while an illuminating connector 5 is located on the edge. As mentioned above, the flat-type back light 4 is inserted into the back of the electrode substrate 1. Four guide members (guide rails) 6a, 6b, 6c, and 6d are placed to smoothly guide the flat-type back light 4 onto the back surface of the electrode substrate 1 until it is secured to it. As described below, the guide apparatus consists of four separate parts: 6a, 6b, 6c, and 6d. FIG. 1 shows how those parts are connected to each other.

Figure 2:
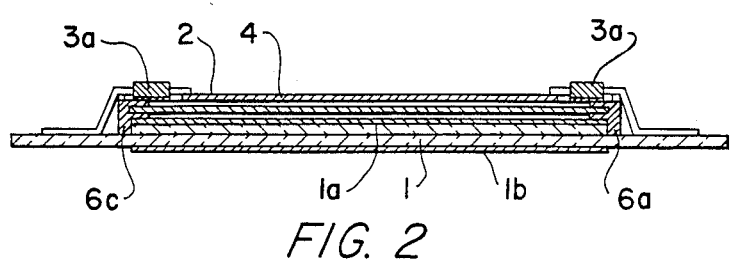
FIGS. 2 and 3 are sectional views of the liquid crystal display device shown in FIG. 1.
Figure 3:
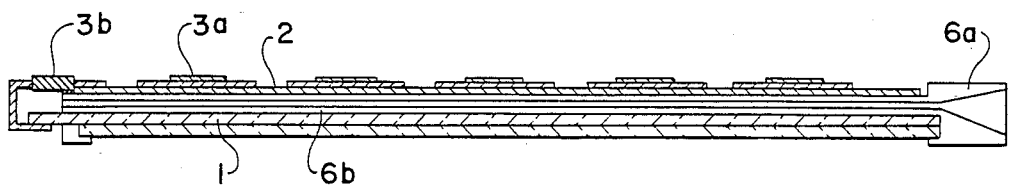

FIG. 2 is a transverse sectional view of the liquid crystal display device incorporating the flat-type back light of line A—A' of FIG. 1 while FIG. 3 is a longitudinal sectional view of line B—B' of FIG. 1. In FIG. 2, the reference numbers 1a and 1b indicate a transparent or translucent polarization sheet respectively. Film-carrier type LSIs 3a and 3b are installed as shown in FIG. 2, and are then connected electrically to the lead-electrode terminal of the electrode substrate 1 by means of a heat-sealed member coated with metallic particles.

Figure 4:
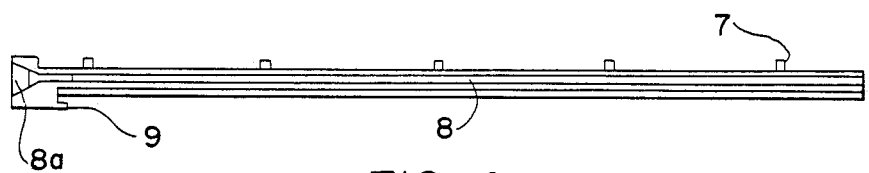
FIG. 4 is an enlarged view of the guide member described above.

The configuration of the guide members 6a, 6b, 6c, and 6d, is described below. Note that guide members 6a and 6c are placed in symmetry to each other as are guide members 6b and 6d. FIG. 4 is an enlarged view of the guide member 6a (6c). In FIG. 4, the left edge is provided with a wide aperture or opening for receiving the back light 4 onto the rear of the liquid crystal display device, whereas the right edge is for the connection of the other guide member 6b (6d). The reference number 7 indicates an adhesive pin or fixing member used to secure guide member 6a (6c) to the circuit substrate 2. This pin or member 7 fits into a hole (not shown) provided in the circuit substrate 2. A Groove 8 is formed along the long side of the guide member 6a (6c) so that a side of the flat-type back light 4 passes through groove 8 and is held securely. Groove 8 has a tapered end 8a with a wide aperture to allow insertion of the flat-type back light, and a narrow internal section to securely hold the back light. FIG. 5 shows the configuration of groove 8, which indicates that the inner portion is narrowed so that the back light 4 can be securely held. The guide member 6a (6c) is provided with a stopper pin 9 to hold the electrode substrate. Referring now to FIG. 6, the configuration of the guide member 6b (6d) is described below. In FIG. 6, the left end allows the connection to the guide member 6a (6c), whereas the right end is the extreme end for the insertion of the flat-type back light 4. The reference number 7′ indicates an adhesion pin (fixing member) which secures the guide member 6b (6d) to the circuit substrate 2, by fitting into a hole (not shown) provided in the circuit substrate 2. A groove 8′ is provided on the long side of the guide member 6b (6d), which is connected to groove 8 of the guide member 6a (6c). A side of the back light 4 passes through groove 8′ and is securely held. As shown in FIG. 7, the joint portion 8′a of groove 8′ is wider than the portion close to the extreme end 8′b, as shown in FIG. 8. Since the configuration of groove 8′ is exactly identical to that which was shown in FIG. 5, description is omitted. A stopper pin 9′ holds guide member 6b (6d) to the electrode substrate.

As is clear from the foregoing description, a liquid crystal display device incorporating an electrode substrate, a circuit substrate, and the flat-type back light reflecting the primary preferred embodiment of the present invention provides the advantages described below.

(A) The new LCD device is provided with a wider aperture which allows easier insertion of the flat-type back light than conventional methods. Even when using an extremely thin flat-type back light, assembly to the liquid crystal display device can be easily carried out due to the presence of a large insertion aperture, thus providing great advantages for the assembly operation.

(B) Since the guide member is provided with a stopper member to be engaged with the electrode substrate, the guide member and the liquid crystal cell rest in close adhesion with each other, significantly enhancing mechanical strength. This closeness of contact provides a great convenience for assembly and handling, thus resulting in improved reliability.

(C) Since the guide apparatus consists of many separate members, each engaged with the electrode substrate, unreasonable pressure, including bending of guide members applied by conventional means can be avoided.

(D) The extreme end of groove is narrowed to securely hold the flat-type back light in position completely freed from the slightest vibration caused by shock, friction, wear or malfunction, an improvement over conventional methods in reliability.

(E) The guide members are provided with fixing members which solidly secure them to the circuit substrate. This configuration allows convenient integration of the circuit substrate, guide members, and the electrode substrate, thus significantly enhancing the resistance against vibration and shock as well as preventing disconnection of electrical connectors.

Figure 9:
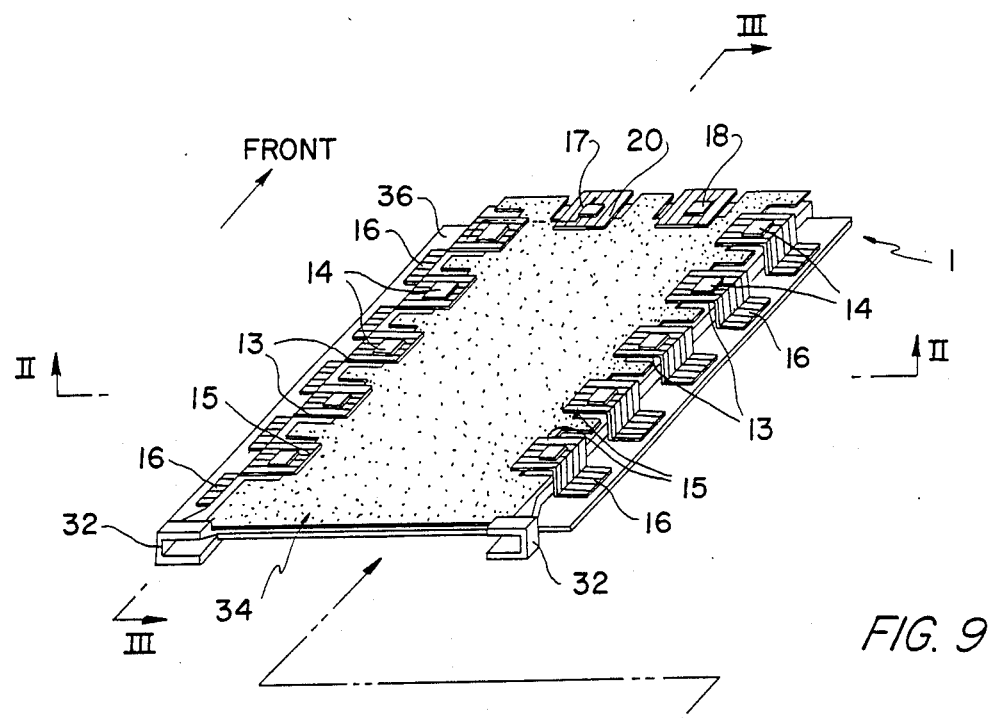
FIG. 9 is an exploded perspective view of the liquid crystal display device provided with back lights reflecting the second preferred embodiment of the present invention.
Figure 9:
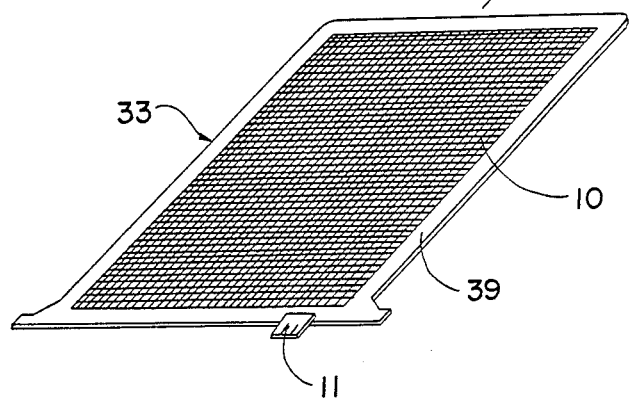

(F) Since a wide groove is provided at the juncture of the guide members, improper installation that may potentially occur at the juncture is eliminated effectively thus, ensuring smoother insertion of the flat-type back light without obstruction. The configuration of a second preferred embodiment is described below. As is clear from FIGS. 9, 10, and 11, the thin LCD device reflecting the second preferred embodiment is comprised of a liquid crystal display panel 31, a wafer-thin back-light 33 securely held by a pair of guide rails 32/32 on the back surface (corresponds to the upper surfaces of the accompanying drawings) of a liquid crystal display panel 31, and a solid-state printed wiring board 34 which is mounted on a pair of the guide rails 32/32. The liquid crystal display panel 31 is composed of an upper panel 35 and a lower panel 36 which are made of translucent materials. The upper panel 35 is narrower and longer than the lower panel 36. The Guide rails 32/32 are installed above the lower panel 36 and along the side of the upper panel 35. Both rails 32/32 are secured to the lower panel 36 with pegs 37 and 38 located on both edges of the long side of the lower panel 36. Guide rails 32/32 clamp and steady the upper panel 35. Liquid crystal is inserted between the upper panel 35 and the lower panel 36 (not shown). A transparent common electrode is attached to the upper panel 35; a transparent segment electrode is attached to the lower panel 36. The back light 33 is provided with a frame 39, a luminous element 10 composed of organic electro-luminescence (EL), and a connector 11 connected to a signal wire (not shown) for illuminating the back light. The frames, located on either side of the luminous element 10 can be inserted into or drawn out of grooves 12.

The solid-state printed wiring board 34 is secured to the upper surface of guide rails 32/32 by means of adhesion or with adhesive pins as required. The edges of the solid-state printed wiring board 34 are provided with notches 13 at specific intervals, each notch 13 containing a film carrier-type LSI 14, which provides power to the segment electrode. The LSI 14 is provided with a wafer-thin input terminal 15 and an output terminal 16. The input terminal 15 is connected to the designated printed pattern (not specifically shown) on the upper surface of the solid-state printed wiring board 34, whereas the output terminal 16, extending in the outside direction, is connected to the terminal of the segment electrode on the upper surface of the lower panel 6 by means of a heat-sealed material containing metallic particles. Thus, the plurality of notches 13 in the positions designated for the installation of respective segment electrode-driving LSIs 14 can accommodate an extremely thin LCD and ensure better contact between the input terminal 15 and the solid-state printed wiring board 34. The front edge of the solid-state printed wiring board 34 is provided with two notches 17, each containing a film-carrier type common electrode-driving LSI 18. The input terminal 20 of the common electrode-driving LSI 18 is connected to the designated printed pattern on the upper surface of the solid-state printed wiring board 34. An output terminal 21 is bent to the inside of the liquid crystal display panel 31, which is connected to the terminal port of the common electrode formed on the back (upper) surface of the upper panel 35. Alternatively, although the non-display area of the upper panel 35 may expand slightly, as shown by the 2-point broken line of FIG. 11, the output terminal 21 may be bent outward to enable connection to the upper surface of the upper panel 35. A variety of elements such as picture memory, controller or a central processing unit (CPU), may also be mounted on the solid-state printed wiring board 34 in addition to the illustrated film-carrier type LSIs 14 and 18. Signal wires used to drive both the segment and common electrodes can be drawn out to the rear portion of the printed wiring board 34, in the identical direction of the backlight driving signal wire (which is connected to connector 11 mentioned above). Since these signal wires can all be drawn out in the same direction, signal wire distribution can be easily accomplished when mounting the liquid crystal display device to a variety of equipment. Note that either a transparent or a translucent back-side polarization sheet 22 can be installed between the upper panel 35 and the back light 33, while a front-side polarization sheet 23 (not shown in FIG. 11) is installed on the front-surface of the lower panel 36.

According to the second preferred embodiment of the present invention, the following advantages can be achieved.

(1) The provision of guide members ensures smoother insertion and replacement of the back light. Since the back light is securely supported by the guide members, camber and friction caused by vibration are minimized. Furthermore while facilitating smoother insertion and replacement of the back light as mentioned above, the guide members conveniently allow mounting of the liquid crystal display panel, back light, and the solid-state printed wiring board in extremely thin layers, enabling manufacturers to produce thinner liquid crystal display devices.

(2) The display-driving, film-carrier type LSIs are themselves mounted on the solid-state printed wiring board, with only their output terminals connected to the liquid crystal display panel. As a result, the LCD herein described offers a spacious display area.

In addition to these benefits, when connecting the output terminal of the film-carrier LSI to the back surface of the liquid crystal display panel, the output terminal, which usually extends in the outside direction, requires a connection portion on the LCD display panel. Thus, the non-display area of the LCD panel is increased. The display area of the LCD panel can be effectively increased, however, by bending the output terminal of the film-carrier LSI to a position inside the display panel before it is connected to the front surface of this panel. As a result, it is possible for the system to significantly improve the amount of effective display area.

(3) Since the printed wiring board mainly accommodates wiring for the input terminal of the film-carrier LSI, a simple printed pattern is sufficient for the manufacturer to produce printed wiring boards at inexpensive cost. Because the printed wiring board itself functions as the cover of the back light, it prevents dust from gathering on the back light. While only certain embodiments of the present invention have been described, it will be apparent to those skilled in the art that various changes and modifications may be made therein without departing from the spirit and scope of the present invention as claimed.

What is claimed is:

1. A liquid crystal display device comprising
a circuit substrate,
a flat back light having first and second edges,
first guide means attached to said circuit substrate for receiving said first edge of said flat back light,
second guide means, parallel to and spaced from said first guide means, attached to said circuit substrate for receiving said second edge of said flat back light, and
an electrode substrate secured to said first and second guide means by stopper pins.

2. A liquid crystal display device as defined in claim 1 wherein said first and second guide means are attached to said circuit substrate by fixing members.

3. A liquid crystal display device as defined in claim 1 wherein said first and second guide means are attached to said circuit substrate by adhesive pins.

4. A liquid crystal display device as defined in claim 1 wherein said first and second guide means each include aligned first and second longitudinal members.

5. A liquid crystal display device comprising
a circuit substrate
a flat back light having first and second edges,
first guide means attached to said circuit substrate for receiving said first edge of said flat back light,
second guide means, parallel to and spaced from said first guide means, attached to said circuit substrate for receiving said second edge of said flat back light,
an electrode substrate secured to said first and second guide means,
said first and second guide means each include aligned first and second longitudinal members, and
each said first longitudinal member has a wide aperture at one end to allow introduction of said flat back light.

6. A liquid crystal display device comprising
a circuit substrate
a flat back light having first and second edges,
first guide means attached to said circuit substrate for receiving said first edge of said flat back light,
second guide means, parallel to and spaced from said first guide means, attached to said circuit substrate for receiving said second edge of said flat back light,
an electrode substrate secured to said first and second guide means,
said first and second guide means each include aligned first and second longitudinal members, and
each of said members has a groove with a bottom and the width of each said groove decreases toward said bottom of said groove.

7. A liquid crystal display device comprising
a circuit substrate
a flat back light having first and second edges,
first guide means attached to said circuit substrate for receiving said first edge of said flat back light,
second guide means, parallel to and spaced from said first guide means, attached to said circuit substrate for receiving said second edge of said flat back light,
an electrode substrate secured to said first and second guide menas,
said first and second guide means each include aligned first and second longitudinal members, and
each of said second longitudinal members has its said groove widened at one portion thereof and narrowed at one portion thereof.

* * * * *